US010268941B2

(12) United States Patent
Guo et al.

(10) Patent No.: US 10,268,941 B2
(45) Date of Patent: Apr. 23, 2019

(54) SMART CARD INFORMATION QUERYING METHOD AND APPARATUS, AND STORAGE MEDIUM (71) Applicant: TENCENT TECHNOLOGY (SHENZHEN) COMPANY LIMITED, Shenzhen (CN)

(72) Inventors: Yixin Guo, Shenzhen (CN); Chun Wang, Shenzhen (CN); Hang Yu, Shenzhen (CN); Xianhua Du, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/861,425

(22) Filed: Jan. 3, 2018

(65) Prior Publication Data
US 2018/0129925 A1 May 10, 2018

Related U.S. Application Data (63) Continuation of application No. PCT/CN2016/083702, filed on May 27, 2016.

(30) Foreign Application Priority Data

Sep. 24, 2015 (CN) .......................... 2015 1 0615926

(51) Int. Cl.
H04B 1/38 (2015.01)
H04M 1/00 (2006.01)
(Continued)

(52) U.S. Cl.
CPC ......... G06K 19/0727 (2013.01); G06F 16/29 (2019.01); G06F 16/9535 (2019.01);
(Continued)

(58) Field of Classification Search
CPC .......... H04W 4/02; H04W 4/80; H04W 8/22; H04W 8/245; H04W 88/02;
(Continued)

(56) References Cited

U.S. PATENT DOCUMENTS 8,423,002 B2 * 4/2013 Hjelm ................... H04W 4/50
455/414.2
2005/0199708 A1 * 9/2005 Friedman ............. G06Q 20/385
235/380

(Continued)

FOREIGN PATENT DOCUMENTS

CN 101141747 A 3/2008
CN 101742469 A 6/2010
(Continued)

OTHER PUBLICATIONS

The World Intellectual Property Organization (WIPO) International Search Report for PCT/CN2016/083702 dated Sep. 2, 2016 5 Pages (including translation).

(Continued)

Primary Examiner — Quochien B Vuong
(74) Attorney, Agent, or Firm — Anova Law Group, PLLC (57) ABSTRACT The present disclosure provides a smart card information querying method, including: sending a terminal configuration request to a server, so that the server determines, according to the terminal configuration request, whether a terminal configuration file cached in a terminal needs to be updated, wherein the terminal configuration file is configured based on a geographical area indicated by a smart card and is used for querying smart card information; receiving an update file delivered by the server, when the server determines that the terminal configuration file cached in the terminal needs to be updated; updating the terminal configuration file cached locally according to the update file (Continued)

delivered by the server; and when a connection is established to the smart card in a short-distance communications mode, querying card information of the smart card according to the updated terminal configuration file.

17 Claims, 5 Drawing Sheets

(51) Int. Cl.
| | |
|---|---|
| G06K 19/07 | (2006.01) |
| G06F 16/29 | (2019.01) |
| G06F 16/9535 | (2019.01) |
| G06Q 20/32 | (2012.01) |
| H04W 4/80 | (2018.01) |
| G06F 17/30 | (2006.01) |
| G06Q 20/34 | (2012.01) |
| H04W 4/50 | (2018.01) |

(52) U.S. Cl.
CPC .. *G06F 17/30241* (2013.01); *G06F 17/30867* (2013.01); *G06Q 20/32* (2013.01); *G06Q 20/349* (2013.01); *H04W 4/50* (2018.02); *H04W 4/80* (2018.02)

(58) Field of Classification Search
CPC ......... H04M 1/72525; H04M 1/72572; H04M 3/42348; H04L 63/0853; H04L 67/34
USPC .......... 455/41.1, 41.3, 414.1, 418, 419, 558, 455/41.2
See application file for complete search history.

(56) References Cited

U.S. PATENT DOCUMENTS

| | | | |
|---|---|---|---|
| 2007/0015538 A1* | 1/2007 | Wang | H04M 1/72525 455/558 |
| 2014/0006247 A1* | 1/2014 | Chai | G06Q 40/04 705/37 |
| 2015/0052056 A1* | 2/2015 | Serebrennikov | G06F 17/30887 705/44 |

FOREIGN PATENT DOCUMENTS

| | | | |
|---|---|---|---|
| CN | 101951361 A | * | 1/2011 |
| CN | 102164179 A | | 8/2011 |
| CN | 103699961 A | | 4/2014 |
| CN | 104715365 A | | 6/2015 |
| CN | 105608573 A | | 5/2016 |

OTHER PUBLICATIONS

The State Intellectual Property Office of the People's Republic of China (SIPO) office Action 1 for 201510615926.6 dated Feb. 4, 2017 9 Pages (including translation).

* cited by examiner

SMART CARD INFORMATION QUERYING METHOD AND APPARATUS, AND STORAGE MEDIUM

CROSS-REFERENCES TO RELATED APPLICATIONS

This application is a continuation application of PCT Patent Application No. PCT/CN2016/083702, filed on May 27, 2016, claims priority to Chinese Patent Application No. 201510615926.6, filed with the Chinese Patent Office on Sep. 24, 2015, and entitled "SMART CARD INFORMATION QUERYING METHOD AND APPARATUS", the entire contents of both of which are incorporated herein by reference.

FIELD OF THE TECHNOLOGY

The present disclosure relates to the field of communications technologies, and in particular, to a smart card information querying method and apparatus, and a storage medium.

BACKGROUND OF THE DISCLOSURE

With the rapid development of computers and Internet technologies, terminals are extremely widely popularized and developed. Therefore, the terminals support more functions.

For example, a user performs payment, recharging, and the like by using a mobile terminal (such as a mobile phone). That is, a user may perform accounting transaction on consumed goods or services by using his mobile phone, to satisfy requirements of the user. For example, a function of recharging a bus card is performed based on Near Field Communication (NFC). First, a terminal application of a third-party cooperative agency is updated and downloaded as an independent plug-in, then payment is performed by using the terminal application, and after payment succeeds, the user is reminded, according to a returned payment result, of performing an operation of swiping the bus card. In this case, a server performs operations of reading and writing data in the bus card by using an NFC interface of the mobile phone, and finally completes the bus card recharging.

In the existing technology, when a function of recharging a bus card of a newly-added city needs to be supported, the third-party cooperative agency is needed to cooperate with updating an installation package. That is, only after the third-party cooperative agency modifies terminal code, and packages and publicizes a new version first, and then a local terminal downloads and updates the installation package of the cooperative agency, the installation package can be put into use. Consequently, problems such as low real-time performance and poor recharging scalability are caused.

SUMMARY

An objective of the present disclosure is to provide a smart card information querying method and apparatus, and a storage medium, to improve real-time performance and scalability of reading and writing of smart card information.

One aspect of the present disclosure provides a smart card information querying method. The method can be applied to a terminal having at least a processor and a memory, and the method includes: sending a terminal configuration request to a server, so that the server determines, according to the terminal configuration request, whether a terminal configuration file cached in a terminal needs to be updated, wherein the terminal configuration file is configured based on a geographical area indicated by a smart card and is used for querying smart card information; receiving an update file delivered by the server, when the server determines that the terminal configuration file cached in the terminal needs to be updated; updating the terminal configuration file cached locally according to the update file delivered by the server; and when a connection is established to the smart card in a short-distance communications mode, querying card information of the smart card according to the updated terminal configuration file.

Another aspect of the present disclosure provides a smart card information querying apparatus, including: a memory and a processor, the memory storing a processor executable instruction. The processor is configured to send a terminal configuration request to a server, so that the server determines, according to the terminal configuration request, whether a terminal configuration file cached in the apparatus needs to be updated, wherein the terminal configuration file is configured based on a geographical area indicated by a smart card and is used for querying smart card information; receive an update file delivered by the server, when the server determines that the terminal configuration file cached in the apparatus needs to be updated; update the terminal configuration file cached locally according to the update file delivered by the server; when a connection is established to the smart card in a short-distance communications mode, query card information of the smart card according to the updated terminal configuration file.

Another aspect of the present disclosure provides a storage medium that stores a processor executable instruction therein, the processor executable instruction being used for causing a processor to complete the following operations: sending a terminal configuration request to a server, so that the server determines, according to the terminal configuration request, whether a terminal configuration file cached in a terminal needs to be updated, wherein the terminal configuration file is configured based on a geographical area indicated by a smart card and is used for querying smart card information; receiving an update file delivered by the server, when the server determines that the terminal configuration file cached in the terminal needs to be updated; updating the terminal configuration file cached locally according to the update file delivered by the server; and when a connection is established to the smart card in a short-distance communications mode, querying card information of the smart card according to the updated terminal configuration file.

BRIEF DESCRIPTION OF THE DRAWINGS

The following describes specific implementations of the present disclosure in detail with reference to the accompanying drawings, so as to make the technical solutions and other beneficial effects of the present disclosure obvious.

DESCRIPTION OF EMBODIMENTS

Referring to the drawings, same component symbols represent same components. A principle of the present disclosure is described by using examples in which the present disclosure is implemented in proper computing environments. The following descriptions are specific embodiments of the present disclosure based on the examples, and should not be construed as a limitation to other specific embodiments of the present disclosure that are not described herein in detail.

In the description that follows, specific embodiments of the present disclosure will be described with reference to steps and symbolic representations of operations that are performed by one or more computers, unless indicated otherwise. As such, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing context, it is not meant to be limiting as those of skill in the art will appreciate that multiple steps and operation described hereinafter may also be implemented in hardware.

A term "module" used in the specification may be regarded as a software object executed in the calculation system. Different components, modules, engines, and services described in the specification may be regarded as objects implemented in the calculation system. The apparatus and method described in the specification is preferably implemented in a form of software, and definitely can be implemented in a form of hardware, both of which fall within the protection scope of the present disclosure.

It should be understood that the sequence of the following embodiments is not limited by the sequence number of the embodiments, that is, the first embodiment is not the optimal embodiment, and the sequence number may be set according to an actual requirement. For example, the first embodiment may be implemented as the second preferred embodiment, the third embodiment may be implemented as the first preferred embodiment, and descriptions as to the first and the second are merely used for representation.

Embodiments of the present disclosure provide a smart card information querying method and apparatus.

Figure 1A:
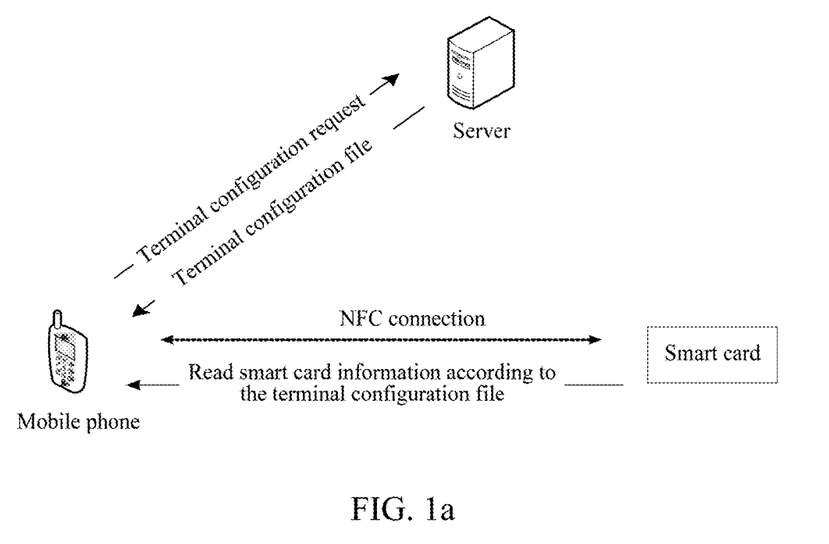
FIG. 1a is a schematic diagram of a scenario of a smart card information querying system according to the present disclosure.

As shown in FIG. 1a, FIG. 1a is a schematic diagram of a scenario of a smart card information querying system according to an embodiment of the present disclosure. The system includes a smart card information querying apparatus and a server. The smart card information querying apparatus may be specifically integrated into a mobile terminal (such as a mobile phone), and is mainly configured to send a terminal configuration request to the server. The server sends a terminal configuration file of a latest version to the mobile terminal according to the terminal configuration request. After establishing a Near Field Communication (NFC) connection with a smart card, the mobile terminal performs querying, such as reading card information of the smart card, by using the terminal configuration file. The terminal configuration file is a file that is configured based on a geographical area indicated by the smart card and that is used for querying smart card information, such as a file that is configured based on a city and that is used for querying a bus card instruction. In addition, the server may determine, according to the terminal configuration request, whether a terminal configuration file cached in a local terminal needs to be updated. If the terminal configuration file cached in the local terminal needs to be updated, the server delivers an update file, and the terminal configuration file cached locally is updated. A specific analysis is performed below.

Figure 4:
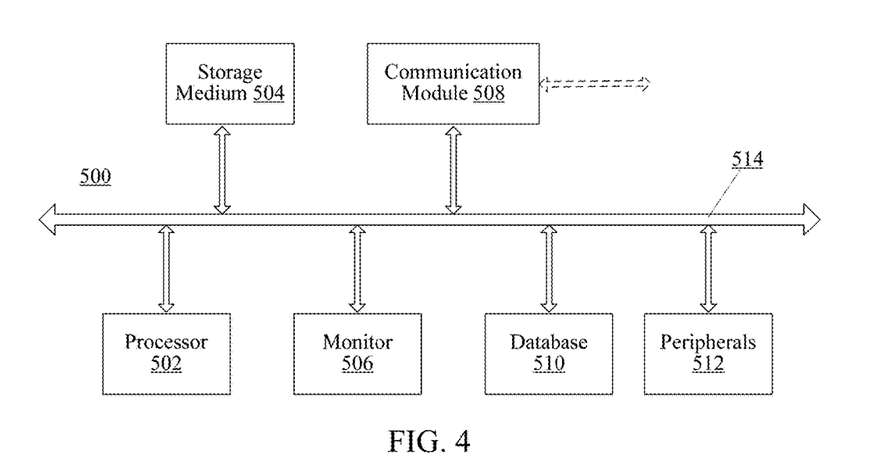
FIG. 4 illustrates a block diagram of an exemplary computer system consistent with the disclosed embodiments.

FIG. 4 shows a block diagram of an exemplary computing system 500 capable of implementing the server and/or the smart card information querying apparatus as shown in FIG. 1A. As shown in FIG. 5, the exemplary computer system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, e.g., Read-Only Memory (ROM), Random Access Memory (RAM), and flash memory modules, and mass storages, e.g., CD-ROM, U-disk, removable hard disk, etc. The storage medium 504 may store computer programs for implementing various processes (e.g., running an smart card reading and operating application, updating and querying terminal configuration file, etc.), when executed by the processor 502.

The monitor 506 may include display devices for displaying contents in the computing system 500, e.g., displaying prompt information indicating operation information related to the smart card. The peripherals 512 may include I/O devices, e.g., keyboard and mouse for inputting information by a user. The peripherals may also include certain sensors, such as NFC chip, gravity sensors, acceleration sensors, and other types of sensors.

Further, the communication module 508 may include network devices for establishing connections through the communication network. The database 510 may include one or more databases for storing certain data and for performing certain operations on the stored data, etc.

In this embodiment, a description is provided from a perspective of a smart card information querying apparatus. The smart card information querying apparatus may be specifically integrated into a mobile terminal, for example, a device such as a mobile phone and a tablet computer.

A smart card information querying method includes: sending a terminal configuration request to a server, so that the server determines, according to the terminal configuration request, whether a terminal configuration file cached in a local terminal needs to be updated, and the terminal configuration file is a file that is configured based on a geographical area indicated by a smart card and that is used for querying smart card information; receiving an update file delivered by the server, when it is determined that the terminal configuration file cached in the local terminal needs to be updated; updating the terminal configuration file cached locally according to the update file delivered by the server; and when it is determined that a connection is established to the smart card in a short-distance communications mode, querying card information of the smart card based on the connection according to the updated terminal configuration file.

Figure 1B:
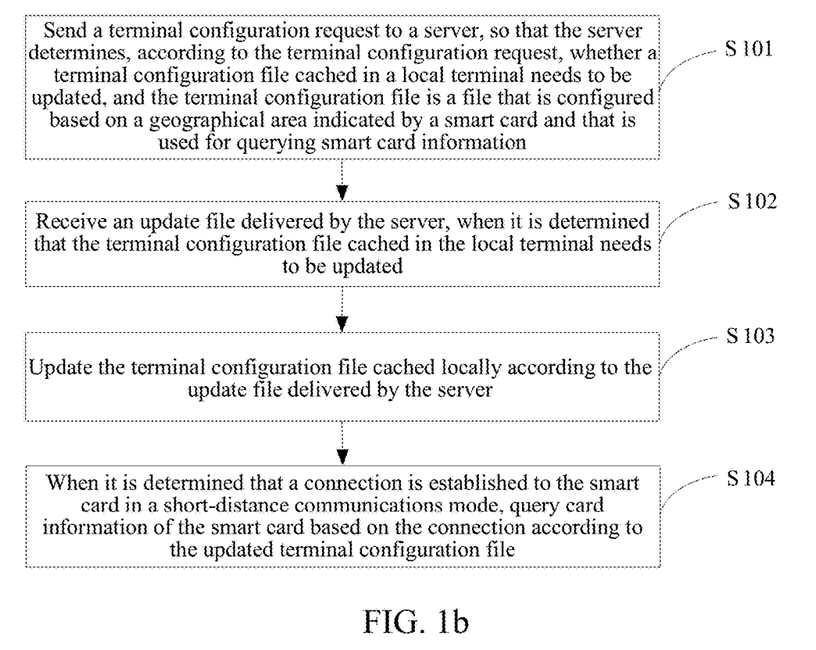
FIG. 1b is a schematic flowchart of a smart card information querying method according to one embodiment of the present disclosure.

Referring to FIG. 1b, FIG. 1b is a schematic flowchart of a smart card information querying method according to a first embodiment of the present disclosure. The method includes the following steps:

In step S101, send a terminal configuration request to a server, so that the server determines, according to the terminal configuration request, whether a terminal configuration file cached in a local terminal needs to be updated, and the terminal configuration file is a file that is configured based on a geographical area indicated by a smart card and that is used for querying smart card information.

In step S102, receive an update file delivered by the server, when it is determined that the terminal configuration file cached in the local terminal needs to be updated.

Details of step S101 and step S102 may be as below.

It may be understood that, the terminal configuration file in this embodiment of the present disclosure is a file that is configured based on the geographical area indicated by the smart card and that is used for querying the smart card information. For example, the terminal configuration file may be specifically a configuration file for querying bus card information or a bus card instruction, and is configured on a background with a geographical area (such as a city, a town, and a district) of the bus card as a dimension. The terminal configuration file includes, but is not limited to, an application protocol data unit (APDU) instruction set, a user interface (UI) dynamic copywriting, and a service procedure switch.

For example, the terminal sends, to the server, the terminal configuration request that carries a first version number, the first version number being a version number of the terminal configuration file cached locally.

When the server determines, according to the first version number, that the terminal configuration file cached in the local terminal needs to be updated, the terminal receives the update file delivered by the server, the update file carrying a version number of a latest terminal configuration file.

Further specifically, for example, when a user enters an application interface of a terminal application, the terminal sends the terminal configuration request to the server, to perform an initialization operation. Alternatively, when detecting that current geographical area information of the terminal changes, the terminal automatically sends the terminal configuration request to the server. The terminal configuration request carries the first version number of the terminal configuration file cached in the local terminal.

The terminal configuration request carries the first version number, and therefore, the server may compare the first version number with the version number of the latest terminal configuration file. If the first version number is not the same as the version number of the latest terminal configuration file, the server delivers an update file to the terminal. The update file carries the version number of the latest terminal configuration file. That is, only when the first version number is not the same as the version number of the latest terminal configuration file, the terminal receives the update file delivered by the server, and updates the terminal configuration file cached locally. That the terminal continues to automatically detect whether the terminal configuration needs to be updated is avoided, and power consumption of the terminal is lowered.

Preferably, the update file may be specifically a terminal configuration file of a latest version, and may be specifically a file that needs to be updated after the terminal configuration file of the latest version in the server is compared with the terminal configuration file cached locally.

Further preferably, by means of a terminal configuration cloudification technology, the terminal may further have a grayscale controlling ability for a service logic. For example, the terminal may upload terminal attribute information to the server, for example, a cloud server. Therefore, the server, for example, the cloud server, determines, according to the terminal attribute information, whether the terminal can support a virtual resource transferring function performed between the smart card and the terminal, and feeds back a determining result to the terminal.

For example, the server sends a first identifier to the terminal, the first identifier being used for indicating whether the terminal can support the virtual resource transferring function performed between the smart card and the terminal. The terminal receives the first identifier, and displays a corresponding first prompt control according to the first identifier, so as to display the determining result of the server and facilitate user operations.

In step S103, update the terminal configuration file cached locally according to the update file delivered by the server.

Preferably, before the "updating the terminal configuration file cached locally according to the update file delivered by the server", the method may further include:

determining whether the update file delivered by the server is the same as an update file delivered to the local terminal; and triggering the updating the terminal configuration file cached locally according to the update file delivered by the server, if the update file delivered by the server is the same as the update file delivered to the local terminal.

That is, after the update file delivered by the server is received, and before the delivered update file is used, signature verification needs to be performed on the update file, to avoid that the file is tampered to cause security vulnerability in a file delivering process, and cause losses to the user. If it is determined that the update file delivered by the server is the same as the update file delivered to the local terminal, it represents that the signature verification of the update file succeeds, and security of file data is improved. Then, the terminal configuration file cached locally is updated by using the update file, to complete localization configuration.

In step S104, when it is determined that a connection is established to the smart card in a short-distance communications mode, query card information of the smart card based on the connection according to the updated terminal configuration file.

Details of step S103 and step S104 may be as below.

It may be understood that, the short-distance communications mode in this embodiment of the present disclosure mainly refers to a communications mode such as Near Field Communication (NFC), Bluetooth, an infrared ray, and an ultrasonic wave. A description is provided in the present disclosure mainly for the NFC technology.

The NFC evolves from Radio Frequency Identification (RFID) and is based on the RFID and an interconnection technology. The NFC is a short-distance and high-frequency radio technology, and may be used at a frequency of 13.56 MHz and a distance within 20 centimeters.

In this embodiment, by means of a terminal configuration cloudification technology, the terminal may further have a grayscale controlling ability for a service logic. For example, according to area configuration information of the smart card in the updated terminal configuration file, whether the virtual resource transferring function performed between the smart card and the terminal is determined based on the geographical area corresponding to the area configuration information.

Further, details may be as below.

1. Extract, from the updated terminal configuration file, area configuration information that is of the smart card and that needs to be queried.

The area configuration information is, for example, configuration information such as application identifier (AID) information of the smart card, and an area number such as a city number.

2. Obtain a second identifier according to the area configuration information of the smart card, the second identifier being used for indicating whether a geographical area corresponding to the area configuration information can support the virtual resource transferring function performed between the smart card and the terminal.

For example, a corresponding geographical area is a city, and the second identifier may indicate, for example, whether the city supports to a function of recharging the smart card by the terminal.

3. Display a corresponding second prompt control according to the second identifier.

The terminal displays the second prompt control and may display, to the user, whether a current city supports the function of recharging the smart card by the terminal.

For another example, querying is performed, for example, the card information of the smart card is read according to the updated terminal configuration file, and whether the geographical area corresponding to the area configuration information can support the smart card querying function, such as querying balance and the application identifier information of the smart card, may further be determined according to the area configuration information of the smart card in the updated terminal configuration file. In addition, by means of the second prompt control, the user is reminded of whether the city supports the function of recharging the smart card by the terminal, thereby facilitating a user operation.

Further, details may be as below.

a. Query the area configuration information of the smart card in the updated terminal configuration file, if it is determined that the terminal configuration file cached locally is the same as the terminal configuration file indicated by the updating file.

b. Match the queried area configuration information with application identifier information that is of the smart card and that needs to be queried. In other words, based on the application identifier information of the smart card, it can be determined that whether a smart card querying function is supported in the geographical area corresponding to the area configuration information.

c. If the matching fails, generate and display a third prompt control.

The third prompt control is configured to indicate that the geographical area corresponding to the area configuration information cannot support a smart card querying function.

d. If the matching succeeds, determine whether there is an area number in the queried area configuration information.

e. If there is no area number, generate and display a fourth prompt control.

The fourth prompt control is configured to indicate that the geographical area corresponding to the area configuration information can support a smart card querying function.

f. If there is the area number, match the area number in the queried area configuration information with an area number that is of the smart card and that needs to be queried.

g. If the matching fails, generate and display the third prompt control.

h. If the matching succeeds, generate and display the fourth prompt control.

By means of a result of matching the queried area configuration information with the application identifier information that is of the smart card and that needs to be queried, whether the geographical area corresponding to the queried area configuration information can support the smart card querying function is first determined. If the matching succeeds, whether the geographical area corresponding to the queried area configuration information can support the smart card querying function is determined again by determining whether there is the area number in the queried area configuration information, and by using a result of the matching of the area number, so that querying in the smart card querying function is more accurate.

In some implementations, when the server determines, according to the first version number, that the terminal configuration file cached in the local terminal does not need to be updated, the card information of the smart card may be directly queried according to the terminal configuration file cached locally. Because the terminal configuration request carries the first version number, the server may compare the first version number with the version number of the latest terminal configuration file. When the first version number is the same as the version number, the terminal does not need to load the terminal configuration file in the server, so that update efficiency is improved and unnecessary power consumption is reduced.

Preferably, before the card information of the smart card is queried according to the terminal configuration file cached locally, signature verification needs to be performed on the terminal configuration file, to avoid that the terminal configuration file is locally tampered to cause security vulnerability, and cause losses to the user. If it is determined that the signature verification of the terminal configuration file cached locally succeeds, localization configuration is completed by using the terminal configuration file.

It may be learned from above that according to the smart card information querying method provided in this embodiment, before querying a smart card, a terminal first needs to send a terminal configuration request to a server. After the server determines that a terminal configuration file cached in the local terminal needs to be updated, the server delivers an update file to the terminal, and the terminal updates the terminal configuration file cached locally by using the update file, so as to query the smart card by using the updated terminal configuration file. The terminal configuration file is a file that is configured based on a geographical area indicated by the smart card and that is used for querying smart card information. In an existing manner, when a function of recharging a bus card of a newly-added city needs to be supported, a third-party cooperative agency is needed to cooperate with updating an installation package. Compared with the existing manner, in this embodiment of the present disclosure, by means of terminal configuration cloudification, the server presets and dynamically updates the terminal configuration file, and delivers the terminal configuration file to the terminal. Therefore, the terminal can query card information of the smart card in real time according to the delivered terminal configuration file, without downloading and updating the installation package of the third-party cooperative agency, thereby improving real-time performance and scalability of reading and writing of the smart card information.

According to the method described in the foregoing embodiment, in an embodiment, configuration cloudification of a terminal and a grayscale controlling ability of the terminal are described in detail by using an example in which an NFC bus card is recharged.

First, for example, each time a user opens a home page of a bus card application, a background server request is initiated for performing some initialization works on the application. One step of the works is that the server needs to deliver a terminal configuration file. Certainly, the server does not need to deliver the terminal configuration file each time, which consumes great network traffic of the user. Based on this, each time the terminal sends a terminal configuration request, the terminal configuration request carries a first version number, the first version number being a version number of a terminal configuration file cached locally. The server compares the first version number with a version number of a latest terminal configuration file, to determine whether to deliver a configuration to the terminal. If the first version number is the same as the version number of the latest terminal configuration file, it indicates that the configuration is not updated. If the first version number is not the same as the version number of the latest terminal configuration file, the server delivers the latest version number and terminal configuration file to the terminal, and the terminal updates the local cache and the version number.

Further, signature verification needs to be performed on the terminal configuration file delivered by the server, to avoid that the file is tampered to cause security vulnerability in a file delivering process, and cause losses to the user. Later, when the user performs a card swiping operation, the terminal may query an instruction of the bus card by using the terminal configuration file, so as to find and display card information to the user.

Figure 2A:
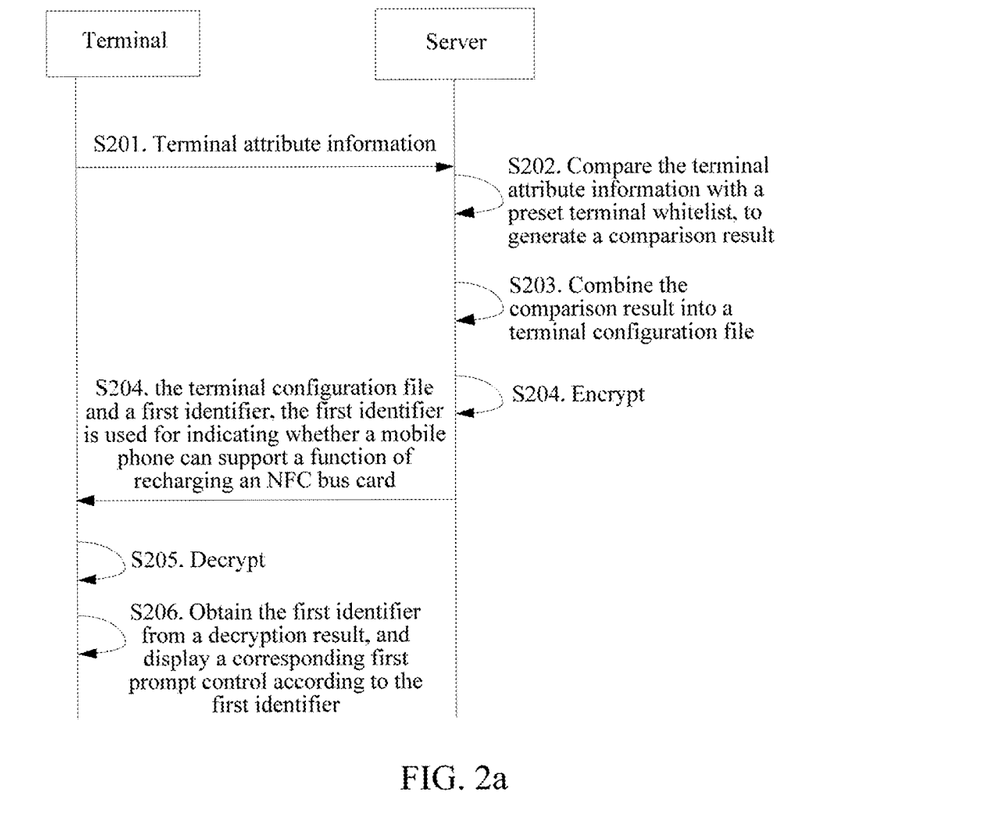
FIG. 2a is a schematic flowchart of a scenario of a smart card information querying method according to one embodiment of the present disclosure.

In this process, by means of a terminal configuration cloudification technology, the bus card application may have a grayscale controlling ability for a service logic. Referring to FIG. 2a, FIG. 2a is a schematic flowchart of determining whether a terminal can support a function of recharging an NFC bus card. The procedure includes the following steps.

In step S201, a terminal uploads terminal attribute information to a server.

For example, the terminal may be specifically a mobile phone. The mobile phone reports information such as a mobile phone model and a Read-Only Memory (ROM) version number to a background.

In step S202, the server compares the terminal attribute information with a preset terminal whitelist, to generate a comparison result.

The terminal whitelist is preset in the server, and the terminal whitelist may specifically include a mobile phone model and a ROM version number. The server determines whether the mobile phone model uploaded by the terminal or the ROM version number corresponding to the mobile phone model exists in the preset terminal whitelist. If the mobile phone model uploaded by the terminal or the ROM version number corresponding to the mobile phone model exists in the preset terminal whitelist, it represents that the mobile phone supports NFC recharging. If the mobile phone model uploaded by the terminal or the ROM version number corresponding to the mobile phone model does not exist in the preset terminal whitelist, it represents that the mobile phone does not support NFC recharging.

In step S203, the server combines the comparison result into a terminal configuration file in the server.

That is, the comparison result is combined with the terminal configuration file, so that when the terminal sends a configuration request to the server, the server delivers the comparison result and the terminal configuration file together to the terminal, and the terminal determines, according to the comparison result, whether the terminal supports the NFC recharging.

In step S204, the server encrypts the terminal configuration file and a first identifier according to a preset encryption format, and sends the encrypted terminal configuration file and first identifier to the terminal.

After encrypting a combination result according to a JavaScript Object Notation (JSON) format, the server sends the combination result to the terminal. JSON, a lightweight data-interchange format, is based on a subset of ECMAScript and uses a text format completely independent of a language.

It may be understood that, the combination result includes the terminal configuration file and the first identifier, and the first identifier is used for indicating whether the mobile phone can support a function of recharging an NFC bus card.

In step S205, the terminal performs decryption.

In step S206, the terminal obtains the first identifier from a decryption result, and displays a corresponding first prompt control according to the first identifier.

The terminal decrypts a background protocol, and searches for a grayscale logic identifier (that is the first identifier) in the decrypted protocol to determine whether a web page displays a recharging button (that is the first prompt control).

That is, the server in FIG. 2a compares the terminal attribute information of the terminal with the preset terminal whitelist, and combines the comparison result into the terminal configuration file (of the server), and delivers the first identifier used for indicating whether the terminal can support the function of recharging the NFC bus card.

Figure 2B:
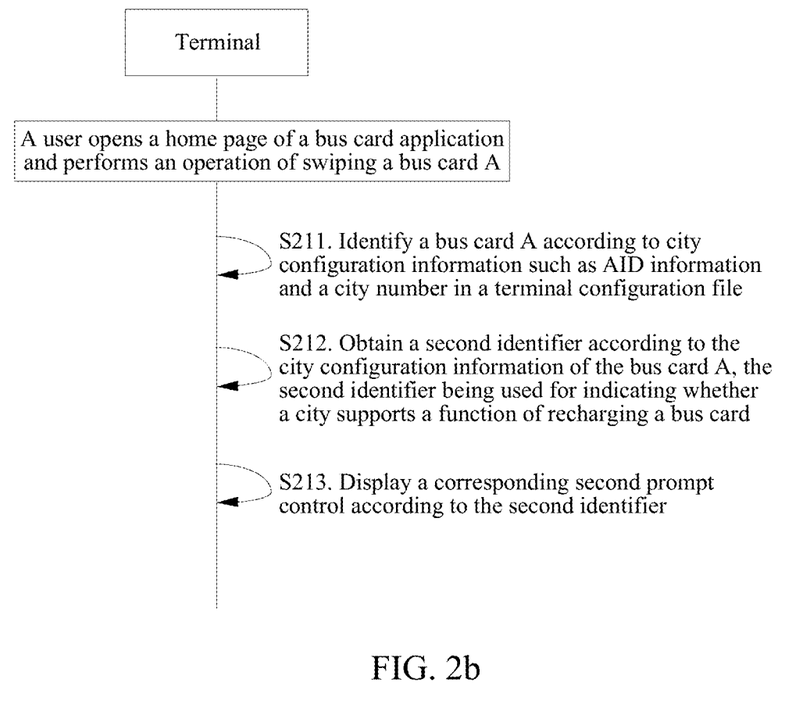
FIG. 2b is a schematic flowchart of another scenario of a smart card information querying method according to one embodiment of the present disclosure.

Further, referring to FIG. 2b, FIG. 2b is a schematic flowchart of determining whether a city can support a function of recharging an NFC bus card. For example, after a user opens a home page of a bus card application and performs an operation of swiping a bus card A, information in the bus card A is read. The procedure may include the following steps.

In step S211, a terminal identifies a bus card A according to city configuration information in a terminal configuration file.

For example, the terminal configuration file includes the city configuration information such as bus card AID information and an area number such as a city number (a description is provided by using the city number as an example). The city configuration information of the bus card A is identified according to the city configuration information.

In step S212, the terminal obtains a second identifier according to the city configuration information of the bus card A.

The second identifier is used for indicating whether a city corresponding to the city configuration information can support a virtual resource transferring function performed between a smart card and the terminal. That is, the second identifier is used for indicating whether a city supports a function of recharging a bus card.

In step S213, the terminal displays a corresponding second prompt control according to the second identifier.

The terminal determines, according to the second identifier, whether the web page displays a recharging button (that is, the second prompt control). The terminal displays the second prompt control and may display, to the user, whether a current city supports the function of recharging the smart card by the terminal.

Figure 2C:
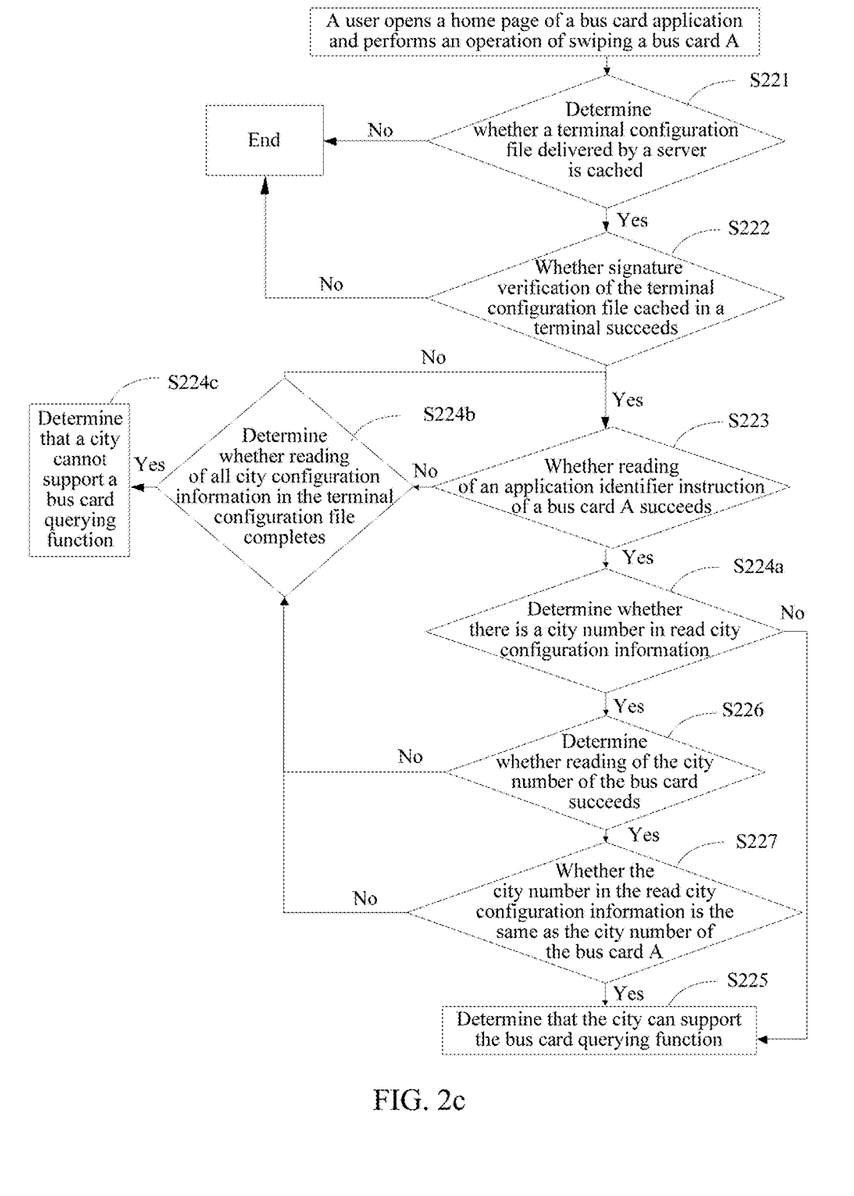
FIG. 2c is a schematic flowchart of another scenario of a smart card information querying method according to one embodiment of the present disclosure.

Further, referring to FIG. 2c, FIG. 2c is a schematic flowchart of determining whether a city can support a bus card querying function. For example, after a user opens a home page of a bus card application and performs an operation of swiping a bus card A, information in the bus card A is read. The procedure may include the following steps.

In step S221, a terminal determines whether a terminal configuration file delivered by a server is cached.

In some implementations, if the terminal configuration file delivered by the server is of a latest version, and an update file is needed when a terminal configuration file cached locally is compared with the terminal configuration file delivered by the server, whether the terminal configuration file indicated by the update file delivered by the server is cached is determined.

If the terminal configuration file indicated by the update file delivered by the server is cached, step S222 is performed. If the terminal configuration file indicated by the update file delivered by the server is not cached, the procedure ends.

In step S222, determine whether signature verification of the terminal configuration file cached in the terminal succeeds.

That is, whether the terminal configuration file delivered by the server is the same as the terminal configuration file delivered to the local terminal needs to be determined. If the terminal configuration file delivered by the server is the same as the terminal configuration file delivered to the local terminal, the signature verification succeeds. The signature verification can avoid that the file is tampered to cause security vulnerability in a file delivering process, and cause losses to the user.

Step S221 and step S222 mean that, only when it is determined that the terminal configuration file cached locally is the same as the terminal configuration file delivered by the server, an operation of reading the city configuration information of the bus card, such as an operation of reading an application identifier instruction of a bus card, and a city number, from the terminal configuration file is performed.

If the terminal configuration file cached locally is the same as the terminal configuration file delivered by the server, step S223 is performed. If the terminal configuration file cached locally is not the same as the terminal configuration file delivered by the server, the procedure ends.

In step S223, determine whether reading of an application identifier instruction of a bus card A succeeds.

That is, the application identifier instruction of the bus card A is read from the terminal configuration file. If the reading of the application identifier instruction of the bus card A succeeds, step S224a is performed. If the reading of the application identifier instruction of the bus card A fails, step S224b is performed.

In step S224b, determine whether reading of all city configuration information in the terminal configuration file completes.

If the reading does not succeed, a configuration instruction of a next city in the bus card is continued to be read, until the reading of all city configuration information in the terminal configuration file completes.

If the reading of all city configuration information in the terminal configuration file completes, step S224c is performed; if the reading of all city configuration information in the terminal configuration file does not complete, step S223 is performed.

In step S224c, determine that a city cannot support a bus card querying function.

That is, all read city configuration information is matched with the application identifier information of the bus card A. If the matching fails, a third prompt control is generated and displayed. The third prompt control is used for indicating that the city does not support the smart card querying function. If the matching succeeds, it is determined whether there is a city number in the read city configuration information.

In step S224a, determine whether there is a city number in read city configuration information.

If there is no city number in the read city configuration information, step S225 is performed; if there is the city number in the read city configuration information, step S226 is performed.

In step S225, determine that the city can support the bus card querying function.

If there is no city number, a fourth prompt control is generated and displayed. The fourth prompt control is used for indicating that the city can support the smart card querying function.

In step S226, determine whether reading of the city number of the bus card succeeds.

If the reading of the city number of the bus card does not succeed, go back to perform step S224b of determining whether reading of all city configuration information in the terminal configuration file completes. If the reading of all city configuration information in the terminal configuration file completes, continue to perform step S224c of determining that a city cannot support a bus card querying function. If the reading of all city configuration information in the terminal configuration file does not complete, go back to perform step S226.

If the reading of the city number of the bus card succeeds, step S227 is performed.

In step S227, determine whether the city number in the read city configuration information is the same as the city number of the bus card A.

If the city number in the read city configuration information is the same as the city number of the bus card A, go back to perform S225 of determining that the city can support the bus card querying function.

If the city number in the read city configuration information is not the same as the city number of the bus card A, go back to perform S224b of determining whether reading of all city configuration information in the terminal configuration file completes. If the reading of all city configuration information in the terminal configuration file completes, perform step S224c of determining that a city cannot support a bus card querying function.

That is, if there is the city number, the city number in the read city configuration information is matched with the city number of the bus card A, and if the matching fails, the third prompt control is generated and displayed, or if the matching succeeds, the fourth prompt control is generated and displayed. The third prompt control is used for indicating that the city cannot support the smart card querying function. The fourth prompt control is used for indicating that the city can support the smart card querying function.

In conclusion, the terminal reads the AID instruction of the bus card. If the reading fails, the terminal continues to read a configuration instruction of a next city in the bus card. If the reading succeeds, the terminal continues to determine whether there is the city number in the configuration. If there is no city number, matching is temporarily performed according to the AID. If a configuration of the bus card is found, the bus card support querying.

The city number of the read card is compared with the city number in the configuration. If the city number of the read card is not the same as the city number in the configuration, a next city configuration is read in a loop manner. If the city number of the read card is the same as the city number in the configuration, it indicates that the configuration of the bus card is found, and the bus card support the querying. Bus cards of some cities do not have a configuration such as a city number. Therefore, if a city number is not configured for a bus card, but an AID is configured for the bus card, it also indicates that the configuration of the bus card is found.

The better understand the idea of the present disclosure, a structure of the terminal configuration file is simply described. For example, the structure may be as below.

```
{
  "global_ver":"", //global version number
" ext":{
  ...
}, //terminal UI configuration
data:[//card-related configuration
{
      city_code:xxx,...//UI display depending on card information
      conf:{ },//procedure configuration
      inst:[
        {
          inst_type: xxx,
          inst_set:[ ]
        },{ }... ...
      ]//bus card instruction set (such as query, recharge, and question)
},{ }... ...
]
    }
```

The terminal configuration file uses a JSON format and ANSI code. A global version number is a version number of a terminal file that is uploaded each time together with an initialization request to the background. .ext is UI configurations of all interfaces of the terminal and is, for example, a copywriting and a logo. .data is specifically some configurations related to the bus card, including an application service procedure switch, a bus card instruction set, and the like. It is easy to think of that the structure of the terminal configuration file is merely described as an example, and does not constitute a limitation to the present disclosure.

It may be understood that, the terminal configuration file may be manually edited, or may be automatically generated by using a web editing management platform and synchronized to the server. In the existing technology, different cities have different instruction formats and service procedures of NFC bus cards. In the present disclosure, the instruction formats, the service procedures, and the like are abstractly configured and then cloudified on the background, so that the user can promptly and efficiently access bus card services of the different cities without updating terminal code. Moreover, only when there is an updated configuration on the background, the terminal downloads and updates the configuration, or otherwise, the terminal completes a bus card service by using a local configuration.

It may be learned from above that according to the smart card information reading method provided in this embodiment, before reading a smart card, a terminal first needs to send a terminal configuration request to a server. After the server determines that a terminal configuration file cached in the local terminal needs to be updated, the server delivers an update file to the terminal, and the terminal updates the terminal configuration file cached locally by using the update file, so as to read the smart card by using the updated terminal configuration file. The terminal configuration file is a file that is configured based on a geographical area indicated by the smart card and that is used for querying smart card information. In an existing manner, when a function of recharging a bus card of a newly-added city needs to be supported, a third-party cooperative agency is needed to cooperate with updating an installation package. Compared with the existing manner, in this embodiment of the present disclosure, by means of terminal configuration cloudification, the server presets and dynamically updates the terminal configuration file, and delivers the terminal configuration file to the terminal. Therefore, the terminal can read card information of the smart card in real time according to the delivered terminal configuration file, without downloading and updating the installation package of the third-party cooperative agency, thereby improving real-time performance and scalability of reading and writing of the smart card information.

For ease of better implementing the smart card information querying method provided in the embodiments of the present disclosure, an embodiment of the present disclosure further provides an apparatus based on the foregoing smart card information querying method. Meanings of the nouns in this embodiment are the same as those in the foregoing smart card information querying method. For specific implementation details, refer to the description in the method embodiments.

Figure 3:
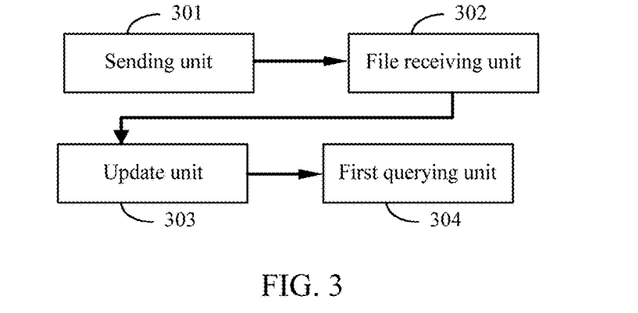
FIG. 3 is a schematic structural diagram of a smart card information querying apparatus according to a third embodiment of the present disclosure.

Referring to FIG. 3, FIG. 3 is a schematic structural diagram of a smart card information querying apparatus according to an embodiment of the present disclosure. The smart card information querying apparatus may include a memory and a processor. The memory stores a processor executable instruction, and the processor may include a sending unit 301, a file receiving unit 302, an update unit 303, and a first querying unit 304.

The sending unit 301 is configured to send a terminal configuration request to a server, so that the server determines, according to the terminal configuration request, whether a terminal configuration file cached in a local terminal needs to be updated, and the terminal configuration file is a file that is configured based on a geographical area indicated by a smart card and that is used for querying smart card information. The file receiving unit 302 is configured to receive an update file delivered by the server, when it is determined that the terminal configuration file cached in the local terminal needs to be updated.

It may be understood that, the terminal configuration file in this embodiment of the present disclosure is a file that is configured based on the geographical area indicated by the smart card and that is used for querying the smart card information. For example, the terminal configuration file may be specifically a configuration file for querying bus card information or a bus card instruction, and is configured on a background with a geographical area (such as a city, a town, and a district) of the bus card as a dimension. The terminal configuration file includes, but is not limited to, an APDU instruction set, a UI dynamic copywriting, and a service procedure switch.

For example, the sending unit 301 is specifically configured to send, to the server, the terminal configuration request that carries a first version number, the first version number being a version number of the terminal configuration file cached locally. The file receiving unit 302 is specifically configured to: receive the update file delivered by the server, when the server determines, according to the first version number, that the terminal configuration file cached in the local terminal needs to be updated, the update file carrying a version number of a latest terminal configuration file.

Further specifically, for example, when a user enters an application interface of a terminal application, the terminal sends the terminal configuration request to the server, to perform an initialization operation. Alternatively, when detecting that current geographical area information of the terminal changes, the terminal automatically sends the terminal configuration request to the server. The terminal configuration request carries the first version number of the terminal configuration file cached in the local terminal.

The server compares the first version number with the version number of the latest terminal configuration file. If the first version number is not the same as the version number of the latest terminal configuration file, the server delivers an update file to the terminal. The update file carries the version number of the latest terminal configuration file.

Preferably, the update file may be specifically a terminal configuration file of a latest version, and may be specifically a file that needs to be updated after the terminal configuration file of the latest version in the server is compared with the terminal configuration file cached locally.

Further preferably, by means of a terminal configuration cloudification technology, the terminal may further have a grayscale controlling ability for a service logic. For example, the processor may further include an upload unit, an identifier receiving unit, and an update unit 303.

The upload unit is configured to upload terminal attribute information to the server, so that the server sends a first identifier according to the terminal attribute information, the first identifier being used for indicating whether the terminal can support a virtual resource transferring function performed between the smart card and the terminal. That is, the server determines, according to the terminal attribute information, whether the terminal can support a virtual resource transferring function performed between the smart card and the terminal, and feeds back a determining result to the terminal.

The identifier receiving unit is configured to: receive the first identifier, and display a corresponding first prompt control according to the first identifier, so as to display the determining result of the server to the user.

The update unit 303 is configured to update the terminal configuration file cached locally according to the update file delivered by the server.

The processor may further include a determining unit, a trigger unit, and a first querying unit.

The determining unit is configured to determine whether the update file delivered by the server is the same as an update file delivered to the local terminal; and the trigger unit, configured to trigger the update unit to update the terminal configuration file cached locally according to the update file delivered by the server, if the update file delivered by the server is the same as the update file delivered to the local terminal.

That is, after the update file delivered by the server is received, and before the delivered update file is used, signature verification needs to be performed on the update file, to avoid that the file is tampered to cause security vulnerability in a file delivering process, and cause losses to the user. If it is determined that the update file delivered by the server is the same as the update file delivered to the local terminal, the signature verification of the update file succeeds, and the terminal configuration file cached locally is updated by using the update file, to complete localization configuration.

The first querying unit 304 is configured to: when it is determined that a connection is established to the smart card in a short-distance communications mode, query card information of the smart card based on the connection according to the updated terminal configuration file.

It may be understood that, the short-distance communications mode in this embodiment of the present disclosure mainly is a communications mode such as NFC, Bluetooth, an infrared ray, and an ultrasonic wave. A description is provided in the present disclosure mainly for the NFC technology.

In this embodiment, by means of a terminal configuration cloudification technology, the terminal may further have a grayscale controlling ability for a service logic. For example, according to area configuration information of the smart card in the updated terminal configuration file, whether a geographical area corresponding to the area configuration information can support the virtual resource transferring function performed between the smart card and the terminal is determined.

Further, details may be as below.

The first querying unit 304 may include an extraction subunit, an obtaining subunit, and a first displaying subunit.

The extraction subunit is configured to extract, from the updated terminal configuration file, area configuration information that is of the smart card and that needs to be queried.

The area configuration information is, for example, configuration information such as AID information of the smart card, and an area number such as a city number.

The obtaining subunit is configured to obtain a second identifier according to the area configuration information of the smart card, the second identifier being used for indicating whether a geographical area corresponding to the area configuration information can support the virtual resource transferring function performed between the smart card and the terminal.

For example, a corresponding geographical area is a city, and the second identifier may indicate, for example, whether the city supports to a function of recharging the smart card by the terminal.

The first displaying subunit is configured to display a corresponding second prompt control according to the second identifier.

The terminal displays the second prompt control and may display, to the user, whether a current city supports the function of recharging the smart card by the terminal.

For another example, according to the card information of the smart card queried in the updated terminal configuration file, and according to the area configuration information of the smart card in the updated terminal configuration file, whether the geographical area corresponding to the area configuration information can support a smart card querying function, such as querying balance and the AID of the smart card, may further be determined.

Further, details may be as below.

The first querying unit 304 may further include a query subunit, a matching subunit, a second displaying subunit, a third prompt control, a determining subunit, a third displaying subunit, and a fourth prompt control.

The query subunit is configured to query the area configuration information of the smart card in the updated terminal configuration file, if it is determined that the terminal configuration file cached locally is the same as the terminal configuration file indicated by the update file.

The matching subunit is configured to match the queried area configuration information with application identifier information that is of the smart card and that needs to be queried.

The second displaying subunit is configured to: if the matching fails, generate and display a third prompt control.

The third prompt control is configured to indicate that the geographical area corresponding to the area configuration information cannot support a smart card querying function.

The determining subunit is configured to: if the matching succeeds, determine whether there is an area number, such as a city number, in the queried area configuration information.

The third displaying subunit is configured to: if there is no area number, generate and display a fourth prompt control.

The fourth prompt control is configured to indicate that the geographical area corresponding to the area configuration information can support a smart card querying function;

The matching subunit is further configured to: if there is the area number, match the area number in the queried area configuration information with an area number that is of the smart card and that needs to be queried;

The second displaying subunit is further configured to: if the matching fails, generate and display the third prompt control; and The third displaying subunit is further configured to: if the matching succeeds, generate and display the fourth prompt control.

In some implementations, the apparatus may further include: a second querying unit, configured to query the card information of the smart card according to the terminal configuration file cached locally, when the server determines, according to the first version number, that the terminal configuration file cached in the local terminal does not need to be updated.

Preferably, before the card information of the smart card is queried according to the terminal configuration file cached locally, signature verification needs to be performed on the terminal configuration file, to avoid that the terminal configuration file is locally tampered to cause security vulnerability, and cause losses to the user. If it is determined that the signature verification of the terminal configuration file cached locally succeeds, localization configuration is completed by using the terminal configuration file.

During specific implementation, each unit above may be implemented as an independent entity, or may be arbitrarily combined and implemented as a same entity or several entities. For specific implementation of each unit above, refer to the foregoing method embodiments, and details are not described herein again.

The smart card information querying apparatus may be specifically integrated into a mobile terminal, for example, a device such as a mobile phone and a tablet computer.

It may be learned from above that according to the smart card information querying apparatus provided in this embodiment, before querying a smart card, a terminal first needs to send a terminal configuration request to a server. After the server determines that a terminal configuration file cached in the local terminal needs to be updated, the server delivers an update file to the terminal, and the terminal updates the terminal configuration file cached locally by using the update file, so as to query the smart card by using the updated terminal configuration file. The terminal configuration file is a file that is configured based on a geographical area indicated by the smart card and that is used for querying smart card information. In an existing manner, when a function of recharging a bus card of a newly-added city needs to be supported, a third-party cooperative agency is needed to cooperate with updating an installation package. Compared with the existing manner, in this embodiment of the present disclosure, by means of terminal configuration cloudification, the server presets and dynamically updates the terminal configuration file, and delivers the terminal configuration file to the terminal. Therefore, the terminal can query card information of the smart card in real time according to the delivered terminal configuration file, without downloading and updating the installation package of the third-party cooperative agency, thereby improving real-time performance and scalability of reading and writing of the smart card information.

In the foregoing embodiments, the descriptions of the embodiments have respective focuses. For a part that is not described in detail in an embodiment, refer to the foregoing detailed description of the smart card information querying method, and details are not described herein again.

The smart card information querying apparatus provided in this embodiment of the present disclosure is, for example, a computer, a tablet computer, and a mobile phone having a touch function. The smart card information querying apparatus and the smart card information querying method in the foregoing embodiments belong to a same concept. Any method provided in the smart card information querying method embodiments may be performed on the smart card information querying apparatus. For a specific implementation process of the smart card information querying apparatus, refer to the smart card information querying method embodiments, and details are not described herein again.

Compared with the existing technology, in the embodiments, before querying a smart card, a terminal first needs to send a terminal configuration request to a server. After the server determines that a terminal configuration file cached in the local terminal needs to be updated, the server delivers an update file to the terminal, and the terminal updates the terminal configuration file cached locally by using the update file, so as to query the smart card by using the updated terminal configuration file. The terminal configuration file is a file that is configured based on a geographical area indicated by the smart card and that is used for querying smart card information. In an existing manner, when a function of recharging a bus card of a newly-added city needs to be supported, a third-party cooperative agency is needed to cooperate with updating an installation package. Compared with the existing manner, in the embodiments of the present disclosure, by means of terminal configuration cloudification, the server presets and dynamically updates the terminal configuration file that is configured based on the geographical area and that is used for querying the smart card information, that is, the server unifies a configuration, and delivers the terminal configuration file to the terminal. Therefore, the terminal can query card information of the smart card in real time according to the delivered terminal configuration file, without downloading and updating the installation package of the third-party cooperative agency, thereby improving real-time performance and scalability of reading and writing of the smart card information.

It should be noted that for the smart card information querying method in the present disclosure, persons of ordinary skill in the art may understand that all or some of the processes of the smart card information querying method according to the embodiments of the present disclosure may be implemented by a computer program by controlling relevant hardware. The computer program may be stored in a computer-readable storage medium, for example, stored in a memory of a terminal, and executed by at least one processor in the terminal, where the execution process may include the processes of the embodiments of the smart card information querying method. The storage medium may be a magnetic disc, an optical disc, a ROM, a random access memory (RAM), or the like.

For the smart card information querying apparatus in the embodiments of the present disclosure, the functional modules thereof may be integrated into one processing chip, or each of the modules may exist alone physically, or two or more modules may be integrated into one module. The integrated modules may be implemented in the form of hardware or software functional modules. When the integrated module is implemented in a form of a software functional module and sold or used as an independent product, the integrated module may be stored in a computer-readable storage medium. The storage medium may be, for example, a ROM, a magnetic disk, or an optical disc.

The smart card information querying method and apparatus, and the storage medium provided in the embodiments of the present disclosure are described above in detail. Although the principles and implementations of the present disclosure are described by using specific examples in this specification, the foregoing descriptions of the embodiments are only intended to help understand the method and core idea of the method of the present disclosure. Meanwhile, persons of ordinary skill in the art may make modifications to the specific implementation manners and application range according to the idea of the present disclosure. In conclusion, the content of the specification should not be construed as a limitation to the present disclosure.

What is claimed is:

1. A smart card information querying method, applied to a terminal having at least a processor and a memory, comprising:
   sending a terminal configuration request to a server, so that the server determines, according to the terminal configuration request, whether a terminal configuration file cached in the terminal needs to be updated, wherein the terminal configuration file is configured based on a geographical area indicated by a smart card and is used for querying smart card information, comprising:
      uploading a terminal attribute information to the server, so that the server sends a first identifier according to the terminal attribute information, the first identifier being used for indicating whether the terminal supports a virtual resource transferring function performed between the smart card and the terminal;
      receiving the first identifier; and
      displaying a first prompt control according to the first identifier;
   receiving an update file delivered by the server, when the server determines that the terminal configuration file cached in the terminal needs to be updated;
   updating the terminal configuration file cached locally according to the update file delivered by the server; and
   when a connection is established to the smart card in a short-distance communications mode, querying card information of the smart card according to the updated terminal configuration file.

2. The smart card information querying method according to claim 1, wherein:
   sending a terminal configuration request to a server further comprises:
      sending, to the server, the terminal configuration request that carries a first version number, the first version number being a version number of the terminal configuration file cached locally; and
   receiving an update file delivered by the server further comprises: receiving the update file delivered by the server, when the server determines, according to the first version number, that the terminal configuration file cached in the terminal needs to be updated, the update file carrying a second version number of a latest terminal configuration file.

3. The smart card information querying method according to claim 2, wherein after the sending, to the server, the terminal configuration request that carries a first version number, the method further comprises:
   querying the card information of the smart card according to the terminal configuration file cached locally, when the server determines, according to the first version number, that the terminal configuration file cached in the terminal does not need to be updated.

4. The smart card information querying method according to claim 1, wherein before the updating the terminal configuration file cached locally according to the update file delivered by the server, the method further comprises:
   determining whether the update file delivered by the server is the same as an update file delivered to the terminal by performing signature verification; and
   triggering the updating of the terminal configuration file cached locally according to the update file delivered by the server, if the update file delivered by the server is the same as the update file delivered to the terminal.

5. The smart card information querying method according to claim 1, wherein the querying card information of the smart card according to the updated terminal configuration file comprises:
   extracting, from the updated terminal configuration file, area configuration information of the smart card;
   obtaining a second identifier according to the area configuration information of the smart card, the second identifier being used for indicating whether the virtual resource transferring function between the smart card and the terminal is supported based on the geographical area corresponding to the area configuration information; and
   displaying a corresponding second prompt control according to the second identifier.

6. The smart card information querying method according to claim 5, wherein the querying card information of the smart card further comprises:
   querying the area configuration information of the smart card in the updated terminal configuration file, if the terminal configuration file cached locally is the same as the terminal configuration file indicated by the update file;
   matching the queried area configuration information with application identifier information of the smart card; and
   if the matching fails, generating and displaying a third prompt control, the third prompt control being configured to indicate that the geographical area corresponding to the area configuration information cannot support a smart card querying function; or
   if the matching succeeds, determining whether an area number exits in the queried area configuration information; and if no area number exists, generating and displaying a fourth prompt control, the fourth prompt control being configured to indicate that the geographical area corresponding to the area configuration information can support a smart card querying function; or
   if the area number exits, matching the area number in the queried area configuration information with an area number of the smart card, and if the matching of the area numbers fails, generating and displaying the third prompt control, or if the matching s of the area numbers ucceeds, generating and displaying the fourth prompt control.

7. A smart card information querying apparatus, comprising a memory and a processor, the memory storing a processor executable instruction, and the processor being configured to:
send a terminal configuration request to a server, so that the server determines, according to the terminal configuration request, whether a terminal configuration file cached in the apparatus needs to be updated, wherein the terminal configuration file is configured based on a geographical area indicated by a smart card and is used for querying smart card information, comprising:
upload a terminal attribute information to the server, so that the server sends a first identifier according to the terminal attribute information, the first identifier being used for indicating whether the apparatus supports a virtual resource transferring function performed between the smart card and the apparatus;
receive the first identifier; and
display a corresponding first prompt control according to the first identifier;
receive an update file delivered by the server, when the server determines that the terminal configuration file cached in the apparatus needs to be updated;
update the terminal configuration file cached locally according to the update file delivered by the server;
when a connection is established to the smart card in a short-distance communications mode, query card information of the smart card according to the updated terminal configuration file.

8. The smart card information querying apparatus according to claim 7, wherein the processor is further configured to:
send, to the server, the terminal configuration request that carries a first version number, the first version number being a version number of the terminal configuration file cached locally; and
receive the update file delivered by the server, when the server determines, according to the first version number, that the terminal configuration file cached in the apparatus needs to be updated, the update file carrying a version number of a latest terminal configuration file.

9. The smart card information querying apparatus according to claim 8, wherein the processor is further configured to:
query the card information of the smart card according to the terminal configuration file cached locally, when the server determines, according to the first version number, that the terminal configuration file cached in the apparatus does not need to be updated.

10. The smart card information querying apparatus according to claim 7, wherein the processor is further configured to:
determine whether the update file delivered by the server is the same as an update file delivered to the apparatus by performing signature verification; and
trigger the update of the terminal configuration file cached locally according to the update file delivered by the server, if the update file delivered by the server is the same as the update file delivered to the apparatus.

11. The smart card information querying apparatus according to claim 7, wherein the processor is further configured to:
extract, from the updated terminal configuration file, area configuration information of the smart card;
obtain a second identifier according to the area configuration information of the smart card, the second identifier being used for indicating whether the virtual resource transferring function performed between the smart card and the apparatus is supported based on the geographical area corresponding to the area configuration information; and
display a corresponding second prompt control according to the second identifier.

12. The smart card information querying apparatus according to claim 11, wherein the processor is further configured to:
query the area configuration information of the smart card in the updated terminal configuration file, if the terminal configuration file cached locally is the same as the terminal configuration file indicated by the update file;
match the queried area configuration information with application identifier information of the smart card;
if the matching fails, generate and display a third prompt control, the third prompt control being configured to indicate that the geographical area corresponding to the area configuration information cannot support a smart card querying function;
if the matching succeeds, determine whether an area number exists in the queried area configuration information;
if no area number exists, generate and display a fourth prompt control, the fourth prompt control being configured to indicate that the geographical area corresponding to the area configuration information can support a smart card querying function;
if the area number exists, match the area number in the queried area configuration information with an area number of the smart card;
if the matching of the area numbers fails, generate and display the third prompt control; and
if the matching of the area numbers succeeds, generate and display the fourth prompt control.

13. A storage medium, storing a processor executable instruction therein, the processor executable instruction being used for causing a processor to perform the following operations:
sending a terminal configuration request to a server, so that the server determines, according to the terminal configuration request, whether a terminal configuration file cached in a terminal needs to be updated, wherein the terminal configuration file is configured based on a geographical area indicated by a smart card and is used for querying smart card information, comprising:
uploading a terminal attribute information to the server, so that the server sends a first identifier according to the terminal attribute information, the first identifier being used for indicating whether the terminal supports a virtual resource transferring function performed between the smart card and the terminal; and
receiving the first identifier, and
displaying a corresponding first prompt control according to the first identifier;
receiving an update file delivered by the server, when the server determines that the terminal configuration file cached in the terminal needs to be updated;
updating the terminal configuration file cached locally according to the update file delivered by the server; and when a connection is established to the smart card in a short-distance communications mode, querying card information of the smart card according to the updated terminal configuration file.

14. The storage medium according to claim 13, wherein the processor executable instruction is used for causing the processor to perform the following operations:
    sending, to the server, the terminal configuration request that carries a first version number, the first version number being a version number of the terminal configuration file cached locally; and
    receiving the update file delivered by the server, when the server determines, according to the first version number, that the terminal configuration file cached in the terminal needs to be updated, the update file carrying a second version number of a latest terminal configuration file.

15. The storage medium according to claim 14, wherein the processor executable instruction is used for causing the processor to perform the following operation:
    querying the card information of the smart card according to the terminal configuration file cached locally, when the server determines, according to the first version number, that the terminal configuration file cached in the terminal does not need to be updated.

16. The storage medium according to claim 13, wherein the processor executable instruction is used for causing the processor to perform the following operations:
    determining whether the update file delivered by the server is the same as an update file delivered to the terminal; and
    triggering the updating of the terminal configuration file cached locally according to the update file delivered by the server, if the update file delivered by the server is the same as the update file delivered to the terminal.

17. The storage medium according to claim 13, wherein the processor executable instruction is used for causing the processor to complete the following operations:
    extracting, from the updated terminal configuration file, area configuration information of the smart card;
    obtaining a second identifier according to the area configuration information of the smart card, the second identifier being used for indicating whether the virtual resource transferring function performed between the smart card and the terminal is supported based on the geographical area corresponding to the area configuration information; and
    displaying a corresponding second prompt control according to the second identifier.

* * * * *